(12) United States Patent
Boast (10) Patent No.: US 8,001,928 B2
(45) Date of Patent: *Aug. 23, 2011

(54) MILKING APPARATUS AND METHOD

(75) Inventor: David Boast, Chippenham (GB)

(73) Assignee: Avon Polymer Products Limited (GB)

( * ) Notice: Subject to any disclaimer, the term of this patent is extended or adjusted under 35 U.S.C. 154(b) by 196 days.

This patent is subject to a terminal disclaimer.

(21) Appl. No.: 12/199,992

(22) Filed: Aug. 28, 2008

(65) Prior Publication Data

US 2009/0056632 A1    Mar. 5, 2009

(30) Foreign Application Priority Data

Aug. 29, 2007 (GB) .................................. 0716800.8

(51) Int. Cl.
*A01J 3/00* (2006.01)
*A01J 5/04* (2006.01)
(52) U.S. Cl. ................. 119/14.02; 119/14.47; 119/14.49
(58) Field of Classification Search ............... 119/14.19, 119/14.2, 14.06, 14.31, 14.49
See application file for complete search history.

(56) References Cited

U.S. PATENT DOCUMENTS

| | | | |
|---|---|---|---|
| 1,430,191 A | 9/1922 | Rutherford | |
| 2,055,718 A * | 9/1936 | Davis | 119/14.49 |
| 2,470,169 A * | 5/1949 | Howse | 119/14.25 |
| 2,502,362 A * | 3/1950 | Babson et al. | 119/14.52 |
| 2,997,980 A * | 8/1961 | Noorlander | 119/14.52 |
| 3,659,558 A | 5/1972 | Noorlander | |
| 3,845,743 A | 11/1974 | Van Staveren | |
| 3,874,338 A | 4/1975 | Happel | |
| 4,249,481 A | 2/1981 | Adams | |
| 4,332,215 A | 6/1982 | Larson | |
| 4,459,939 A * | 7/1984 | Noorlander | 119/14.49 |
| 5,069,162 A | 12/1991 | Thompson et al. | |
| 6,039,001 A | 3/2000 | Sanford | |
| 6,308,656 B1 * | 10/2001 | Milbrath et al. | 119/14.47 |
| 6,427,624 B1 | 8/2002 | Briggs | |
| 6,435,132 B1 | 8/2002 | Milbrath et al. | |
| 6,546,893 B1 | 4/2003 | Happel et al. | |
| 6,588,364 B1 | 7/2003 | Petterson | |
| 6,631,694 B1 | 10/2003 | Chowdhury | |
| 6,745,718 B1 | 6/2004 | Chowdhury | |
| 6,755,153 B1 | 6/2004 | Chowdhury | |
| 6,776,120 B1 * | 8/2004 | Chowdhury | 119/14.46 |
| 6,796,272 B1 | 9/2004 | Chowdhury | |
| 6,857,389 B2 * | 2/2005 | Miller | 119/14.49 |
| 6,997,136 B1 | 2/2006 | Coates | |
| 7,540,258 B2 * | 6/2009 | Boast | 119/14.49 |

FOREIGN PATENT DOCUMENTS

| | | |
|---|---|---|
| EP | 0105206 | 4/1984 |
| EP | 1647183 A2 | 4/2006 |
| WO | 0076300 | 12/2000 |

* cited by examiner

*Primary Examiner* — Joshua J Michener
*Assistant Examiner* — Joshua Huson
(74) *Attorney, Agent, or Firm* — McGarry Bair PC (57) ABSTRACT

The invention relates to apparatus for milking animals such as cows, components of the apparatus and methods of milking animals employing the apparatus. The apparatus comprises at least two resilient membranes having a space therebetween into which the teat of the animal may be inserted. The membranes are held by a support structure under tension in a direction transverse to the direction of insertion of the teat, to protect the teat from excessive force when the membranes fall onto the teat.

31 Claims, 3 Drawing Sheets fig 1A

MILKING APPARATUS AND METHOD

CROSS-REFERENCE TO RELATED APPLICATION

This application claims the benefit of GB0716800.8, filed Aug. 29, 2007, which is incorporated herein by reference in its entirety. This application is also related to U.S. patent application Ser. No. 11/252,268, filed Oct. 17, 2005.

BACKGROUND OF THE INVENTION

1. Field of the Invention

The present invention relates to a milking apparatus, i.e. an apparatus for removing milk from a teat of an animal, such as a cow, sheep, goat, horse, buffalo, or camel. It also relates to a method of use of such an apparatus.

2. Summary of the Prior Art

In a conventional milking apparatus, a cylindrical liner of resilient material is housed within an outer body, and the liner is tensioned along the axis of the cylinder. The teat of the animal is then inserted through an opening in the body into the cylindrical liner, and then suction is applied to another opening in the body, at the other end of the cylindrical liner to that in which the teat is inserted, to create a partial vacuum. This partial vacuum draws milk from the teat, but also causes congestion of the teat tissues, arising from the accumulation of blood and other fluids. In order to relieve this congestion, the region between the outer body and the liner is periodically brought to atmospheric pressure. This causes the liner to collapse around the teat, so providing relief from the suction. Such milking apparatuses have been known for around 100 years, and although many modifications to the basic arrangement have been suggested, such as the application of a periodic over pressure around the liner, rather than atmospheric pressure, the basic arrangement has stayed the same. Thus, the basic liner arrangement disclosed in e.g. GB270316, published in 1927, is not dissimilar from e.g. U.S. Pat. No. 6,427,624 published in 2002.

One problem associated with the liner arrangement in the conventional apparatus described above is that, when the region between the body and the liner is brought to atmospheric pressure, the liner closes in tightly around the teat end, so that the end of the teat often experiences excessive local pressure. This means that, in order to avoid damage to the teat end, only low suction forces may be applied to the teat as a whole during milking and any periodic over pressure applied to the outside of the liner must also be kept at a low level. Thus, the efficiency of the milking process is impaired by the need to avoid excessive force being applied to the teat end, so as to maintain teat health.

Recently, improvements have been made to the conventional apparatus described above, so that when the liner closes in around the teat in order to relieve congestion of the teat tissue, it collapses more evenly along the length of the teat. EP1647183 describes a milking apparatus in which the liner has membranes that are held under transverse tension i.e. tension in a direction generally perpendicular to the direction of elongation of the barrel of the teat. The membranes are held under this transverse tension in their normal rest state, i.e. even when the milking apparatus is not in operation and no suction or over pressure is being applied.

The purpose of the transverse tension is to prevent the membranes contracting too closely around the teat end when the milking apparatus is in operation. Thus, excessively high forces and damage to the teat end can be avoided, while at the same time, maintaining the suction forces experienced by the teat at sufficiently high levels to achieve efficient milking action.

The transverse tension in the liners allows the pressure applied to the barrel of the teat to be maintained at useful levels for milking, while at the same time preventing damage to the teat end when the liner collapses around the teat to relieve congestion within the teat. In effect, the transverse tension of the liners allows the liners to collapse more evenly along the length of the teat during milking than is the case in the conventional milking apparatus described above, and so the milking process partly mimics the sucking action of a calf.

In the milking apparatus described in EP1647183, transverse tension of the membranes of the liner is achieved by fixing the membranes to attachment points on the interior walls of the outer body housing the liner or onto rods fixed within the outer body. However, since these attachment points are only accessible from the interior of the body housing the liner, the process of affixing the membranes to the outer body, so that they are under transverse tension, is awkward and time-consuming. Furthermore, the outer body often includes external attachments which make it difficult to manipulate. Another problem is that the attachment of the liner membranes directly to the outer body requires the outer body, which is in general a standard component, to be specially adapted to hold the membranes.

SUMMARY OF THE INVENTION

At its most general, the present invention proposes that the milking apparatus described above, in which the membranes of the liner are held under transverse tension, be provided with a support structure which is not a fixed part of the outer body and so may be insertable into the outer body. The function of the support structure is to hold the membranes of the liner under transverse tension. As the support structure is not a fixed part of the outer body, and functions to hold the membranes of the liner under transverse tension, it will be understood that the support structure may perform this function independently of the outer body. Accordingly, during assembly of the milking apparatus, the membranes may be first mounted onto the support structure, which is then inserted into the outer body. By means of this arrangement, the membranes may be already under transverse tension when they are inserted into the outer body.

The support structure is not a fixed part of the outer body, so in other words may be a discrete component of the apparatus and adapted to be removable from the outer body. By providing such a separate support structure onto which the membranes may be mounted e.g. before they are inserted into the outer body, it is possible to design a support structure that is easy to manipulate and which allows the membranes to be placed under transverse tension more easily than is the case for the apparatus of the prior art. Note, however, that the present invention does not exclude the possibility that the support structure is positioned within the outer body before the membranes are mounted thereon.

Furthermore, the use of a support structure allows the milking apparatus to be assembled using a standard outer body component, which does not need to be adapted to hold the membranes of the liner under transverse tension.

Thus, in one aspect the present invention may provide apparatus for removing milk from the teat of an animal, comprising:

an outer body having an opening therein into which the teat is insertable in a first direction;

at least a first and a second resilient membrane, the first and second membranes being held within the outer body, the membranes forming a space therebetween into which the teat is receivable when it is inserted into the opening;

a support structure on which the membranes are mounted, which support structure maintains the membranes under tension in a direction transverse to said first direction when there is the same pressure across the membranes, wherein the support structure is housed within the outer body and maintains the membranes under said tension independently of the outer body; and a pressure generating device for providing a pressure difference across said membranes.

In some embodiments, the present invention may provide apparatus for removing milk from the teat of an animal, comprising:

an outer body having an opening therein into which the teat is insertable in a first direction;

at least a first and second resilient membranes, the first and second membranes being held within the body and forming a space therebetween into which the teat is receivable when it is inserted into the opening;

a support structure held within the body, the support structure having a first tensioning element having two spaced-apart attachment points and a second tensioning element having two spaced-apart attachment points, the first membrane being attached to the first tensioning element of the support structure at the two spaced-apart attachment points, so that the first membrane is under tension in a direction transverse to said first direction when there is the same pressure across the membranes, the second membrane being attached to the second tensioning element of the support structure at the two spaced-apart attachment points, so that the second membrane is under tension in a direction transverse to said first direction when there is the same pressure across the membranes; and a pressure generating device for applying a pressure difference across the membranes.

As discussed above, the support structure is not a fixed part of the apparatus. Accordingly, in another aspect, the present invention may provide a kit of parts for constructing an apparatus for removing milk from the teat of an animal, the kit comprising:

an outer body having an opening therein into which the teat is insertable in a first direction;

at least a first and a second resilient membrane holdable within the outer body;

at least a first tensioning element having two spaced-apart attachment points and a second tensioning element having two spaced apart attachment points for constructing a support structure, the support structure being housable within the outer body; and a pressure generating device for providing a pressure difference across said membranes, wherein the first membrane is attachable to the first tensioning element at the two spaced-apart attachment points so that the first membrane is under tension in a direction transverse to said first direction when there is the same pressure across the membranes and wherein the second membrane is attachable to the second tensioning element so that the second membrane is under tension in a direction transverse to the first direction when there is the same pressure across the membranes, wherein the tensioning elements of the support structure are capable of maintaining the membranes under said tension independently of the outer body.

The support structure is not a fixed part of the apparatus and so may hold the membranes under transverse tension independently of the outer body of the milking apparatus. Accordingly, in another aspect, the present invention may provide a component of an apparatus for removing milk from the teat of an animal, the component having an elongate shape defining a first direction along its direction of elongation, the component comprising at least a first and a second resilient membrane, and a support structure on which the first and second membranes are mounted, the support structure having a first tensioning element having two spaced-apart attachment points and a second tensioning element having two spaced-apart attachment points, wherein the first membrane is attached to the first tensioning element of the support structure at the two spaced-apart attachment points, so that the first membrane is under tension in a direction transverse to said first direction when there is the same pressure across the membranes, and the second membrane is attached to the second tensioning element of the support structure at the two spaced-apart attachment points, so that the second membrane is under tension in a direction transverse to said first direction when there is the same pressure across the membranes.

Similarly, in a further aspect, the present invention may provide a kit of parts for constructing a component of an apparatus for removing milk from the teat of an animal, the kit comprising at least a first and a second resilient membrane; and at least a first tensioning element having two spaced-apart attachment points and a second tensioning element having two spaced-apart attachment points, wherein said membranes and said tensioning elements are attachable together to form a component having an elongate shape and defining a first direction along its elongation direction, and wherein the first membrane is attachable to the first tensioning element at the two spaced-apart attachment points so that the first membrane is under tension in a direction transverse to said first direction when there is the same pressure across the membranes and wherein the second membrane is attachable to the second tensioning element so that the second membrane is under tension in a direction transverse to the first direction when there is the same pressure across the membranes.

The apparatus provided by the present invention is useful for milking animals. Accordingly, in a still further aspect, the present invention may provide a method of removing milk from the teat of an animal, comprising:

inserting the teat into a space formed between at least a first and a second resilient membrane housed in an outer body; and generating a pressure difference across said membranes to cause the membranes to fall onto the teat, wherein the membranes are mounted on a support structure, and maintained under tension in a direction transverse to the teat insertion direction by the support structure before the pressure difference is generated across the membranes, wherein the support structure is housed within the outer body and maintains the membranes under said tension independently of the outer body.

Accordingly, the present invention provides a support structure which holds the membranes of the liner under transverse tension. As will be understood from the discussion above, it may be preferable that the support structure has a first tensioning element having two spaced-apart attachment points and a second tensioning element having two spaced apart attachment point. The first membrane may be attached or attachable to the first tensioning element of the support structure at the two spaced apart attachment points so that the first membrane is under tension in a direction transverse to the first direction. Similarly, the second membrane may be attached to the second tensioning element of the support structure at the two spaced-apart attachment points so that the second membrane is under tension in a direction transverse to the first direction when there is the same pressure across the membranes. This tensioning effect may be achieved by making the relaxed distance between attachment points on, for example, the first tensioning element of the support structure greater than the relaxed length of the first membrane which is to span these points and similarly for the second membrane and corresponding tensioning element. The attachment points of the support structure are spaced radially inward from the outer body.

The tensioning elements may be elongate structures extending substantially along the length of the liner, each tensioning element having a plurality of further pairs of spaced-apart attachment points located along the length of the tensioning elements. The pairs of spaced-apart attachment points on each tensioning element may in fact be merged to form a pair of spaced-apart attachment regions, possibly extending along the edges of the tensioning elements. In other words, the attachment points may actually be lines, possibly extending along the edges of the tensioning elements.

Preferably, the tensioning elements are themselves resilient. This means they may be flexed in order to facilitate mounting of the membrane.

The section between the two attachment points on each tensioning element may be either straight or curved, or have a peak. When curved or peaked elements are used, attachment of the membranes becomes easier, since the elements are capable of being flexed more easily than straight elements in order to bring the distance between the attachment points closer to the relaxed length of the membrane. Furthermore, using curved or peaked tensioning elements, particularly peaked elements, it is easier to tension the membranes at the low transverse stress levels preferred for milking, since the elements will tend to bend to relieve some of the tension in the membrane.

Preferably, the tensioning elements of the support structure to which the membranes are attached are joined to form a tube enclosing the membranes. The tensioning elements of the support structure may be held together by the membranes themselves or may be connected directly to each other.

The membranes may be tensioned by being clipped onto the support structure at the attachment points. Otherwise, they may be attached to the support structure by means of protrusions formed on the membranes, the protrusions being capable of engaging with slots present at the attachment points of the support structure. The protrusions may be ribs extending along the edges of the membranes. The protrusions can also be beads present on the edges of the membranes.

Preferably, the space formed by the membranes is an enclosed space sealed from the outer body.

To facilitate the use of the support structure in apparatus with a standard outer body component as discussed above, the membranes or the support structure may have an engagement portion attached thereto, for engaging with the outer body to support the membranes and support structure in the outer body. Preferably the engagement portion is a flange which fits over the top of the body, possibly attached to the membranes.

The resilient membranes may be put under axial tension (i.e. tension in the first direction), as well as transverse tension, in order to tune the membranes more effectively to the shape of the teat. In this case, it may be useful for the level of axial tension to be adjustable. Such tuning allows improved control over the pressures (forces) exerted on the teat and therefore may be used to ensure effective milking action, while optimizing teat health.

It is possible for the present invention to be embodied using only two resilient membranes, arranged generally parallel to each other. However, preferably there are three membranes, joined together to form a triangular cross-section. The teat is then inserted between the membranes, perpendicular to the plane of such triangle. Then, the pressure difference closes the membranes on the teat. In a further alternative, four or more membranes may be used.

In the case that there are three or more membranes, joined together to form a polygonal cross-section, the membranes may be attached to the support structure at the joins between the membranes.

The membranes may be part of a one piece liner mounted inside the outer body.

Normally, the space between the membranes will be subject to suction, in a way similar to the interior of known liners, while the region between the outside of the membranes and the interior of the body into which the membranes are received is periodically brought to atmospheric pressure in order for the liner to close around the teat, thus providing temporary relief from the suction forces and reducing teat congestion. However, it is possible instead to provide a periodic overpressure to the region between the membranes and the outer body, since it is believed that such a positive pressure is of beneficial effect, as it matches the internal pressure of the teat more closely. Furthermore, it is possible to use only over pressure without suction being applied to the interior of the liner.

Whilst the membranes may be of uniform thickness, it is possible for their thickness to vary, since that will vary the tension and hence the pressure exerted on the teat, along the length of the teat. Preferably, the transverse tension in the liner is relatively low, so that when the liner closes on the teat, it mimics the action of a suckling calf. Preferably, the membranes are made from a low modulus rubber. The average wall thickness is preferably low, e.g. less than 1.5 mm, preferably less than 1.3 mm. Additionally or alternatively, the modulus of the material (preferably rubber) of the membranes may also be low, in order achieve the desired low tension. Preferably, the shear modulus of the material is 0.8 $MNm^{-2}$ or less.

Preferably, the thickness and/or shear modulus value of the membranes varies in the axial (first) direction. The pressure distribution effected by the membranes on the teat depends on membrane thickness and shear modulus, so the pressure distribution can be matched to the shape of a teat. Thus, liners tailored to specific shapes of teat may be made. For instance, cows can have conical teats, parallel teats and barrel shaped teats. Goats and sheep also have shapes where more or less tension may need to be applied to a particular part of the teat. Also, a cow may have three teats of one shape and of another a different shape, all on the same udder. The present invention may allow teat liners to be designed to deal with such situations.

Although the present invention has been discussed above in terms of apparatus for removing milk from the teat of an animal, such as a cow, sheep, goat, horse, buffalo, or camel, the present invention also relates to a method of removing milk, in which the teat is inserted between the resilient membranes of the apparatus and a periodic pressure difference generated across those membranes causes the membranes to fall onto the teat.

BRIEF DESCRIPTION OF THE DRAWINGS

Embodiments of the present invention will now be described in detail, by way of example, with reference to the accompanying drawings, in which.

DETAILED DESCRIPTION

Figure 1A:
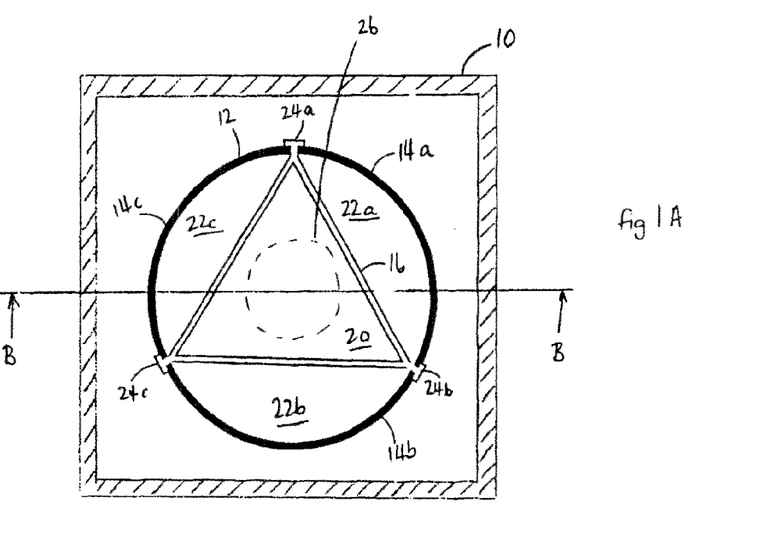
FIGS. 1A, 1B, and 1C are a first embodiment of the invention, FIG. 1A being the transverse section along the line A to A in FIG. 1B, FIG. 1B being the transverse section along line B to B in FIG. 1A, and FIG. 1C showing the liner element 16 of FIG. 1A in detail.
Figure 1B:
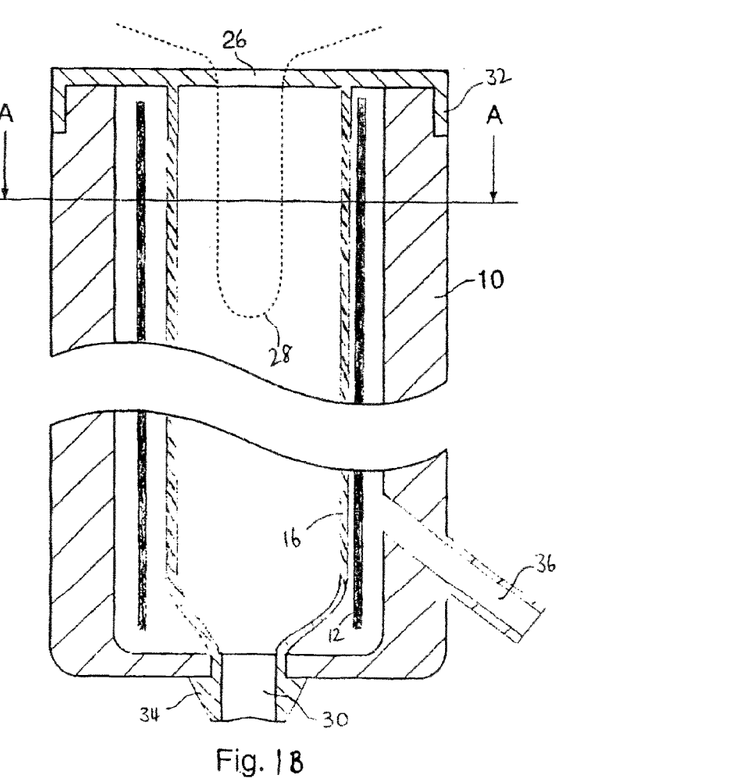
Figure 1C:
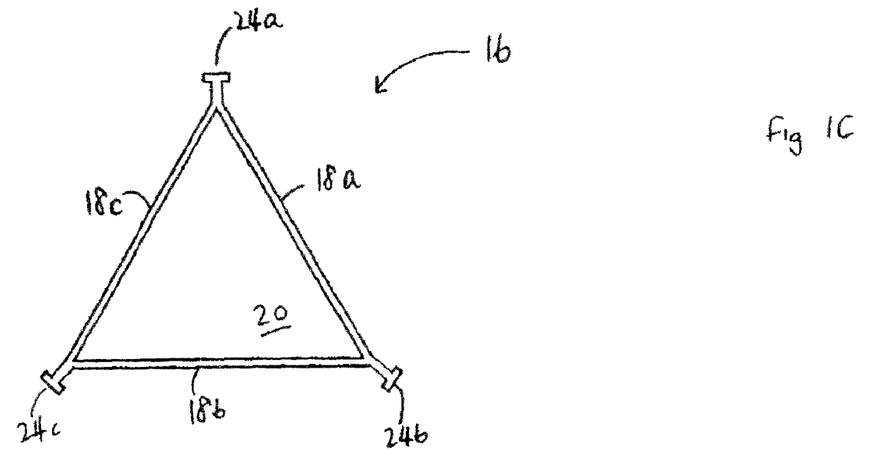

Referring first to FIGS. 1A, 1B, and 1C, a milking apparatus comprises an outer body 10, the interior of which is hollow and which contains a support structure 12, into which is mounted a liner 16. The support structure has three tensioning elements 14a, 14b, 14c corresponding to the three resilient membranes 18a, 18b, 18c of the liner 16. The three membranes 18a, 18b, 18c of the liner 16 are joined at their longitudinal edges to define a space 20 therebetween which is triangular in transverse section and further spaces 22a, 22b, 22c, which are each bounded by one of the membranes 18a, 18b, 18c and the corresponding tensioning element 14a, 14b, 14c of the support structure. Locks 24a, 24b, 24c at the longitudinal joins of the membranes 18a, 18b, 18c allow each membrane to be clipped at its edges to tensioning elements 14a, 14b, 14c of the support structure.

In this embodiment, each lock 24a, 24b, 24c is clipped to two tensioning elements 14a, 14b, 14c of the support structure 12 and thus brings the edges of the tensioning elements of the support structure together. However, this is not essential, and further embodiments may be possible in which each lock provided on a membrane clips onto only one tensioning element of the support structure.

The body 10 has an opening 26 at its upper end, aligned with the space 20, into which a teat 28 of e.g. a cow may be received. At the end of the body 10 remote from the opening 26 is a suction outlet 30 which is connected to a vacuum apparatus for generating a reduced pressure within the space 20.

In this embodiment, the support structure 12 is independent of the outer body 10. However, the support structure may also be attached to the outer body, e.g. to hold the support structure 12 and hence the liner 16 in place.

Each of the resilient membranes 18a, 18b, 18c is held under transverse tension, i.e. tension in the plane of the view of FIG. 1A, when mounted in the corresponding tensioning element 14a, 14b, 14c of the support structure 12. This is achieved by making the relaxed spacing of the edges of the tensioning elements 14a, 14b, 14c greater than the relaxed spacing of the locks 24a, 24b, 24c.

When suction is applied to the outlet 30, thereby reducing the pressure in the space 20 relative to the internal pressure of the teat, milk is expressed from the teat and passes out of the outlet 30. The spaces 22a, 22b, 22c experience cyclic pressure induced by a pulsator (not shown) attached to the inlet 36. The lowest level of the pressure cycle induced by the pulsator corresponds to the pressure induced in the space 20, while the highest level of the pressure cycle corresponds to atmospheric pressure.

When the pressure in the spaces 22a, 22b, 22c is greater than the pressure in the space 20, the membranes 18a, 18b, 18c are deformed onto the teat and the space 20 closes around the teat, thereby providing temporary relief from suction and reducing congestion of the teat tissue. By holding the membranes 18a, 18b, 18c under transverse tension, they are unable to become wrapped too closely around the teat end during the process of collapse of the liner onto the teat. Thus, the local forces acting on the teat end are prevented from reaching excessive levels that might impair teat health. At the same time, substantial pressure may be applied to the barrel of the teat, in order to relieve congestion of the teat tissue, arising from the build-up of blood and other fluids, and a good balance is achieved between the requirements of teat health and milking efficiency. Indeed, the maximum pressure induced by the pulsator may be raised above atmospheric pressure, so as to match more closely the internal pressure of the teat.

In effect, the action of the resilient membranes, when placed under transverse tension, partly mimics the sucking action of a calf, by applying pressure over substantially the whole length of the teat within the milking apparatus, without exerting excessive forces on the end of the teat.

By mounting the membranes 18a, 18b, 18c of the liner 16 onto the tensioning elements 14a, 14b, 14c of the support structure 12 and inserting this structure into the outer body 10, the assembly of the milking apparatus is greatly simplified, as the tensioning elements 14a, 14b, 14c of the support structure 12 are easier to manipulate than the outer body 10. In addition to this, no special attachment points for tensioning the membranes are necessary in the outer body 10, and thus a standard component may be used.

In this first embodiment, the liner 16 has an upper flange 32 which fits over the top of the outer body 10. The suction outlet 30 is integral with the membranes 18a, 18b, 18c and has a further flange 34 fitting over the bottom of the body 10. Thus, in this arrangement, it is possible for the membranes to be under longitudinal tension (i.e. in the axial direction of the teat) as well as under transverse tension. This allows the balance between the barrel pressure and the teat end pressure to be optimized by adjustment of the transverse and axial tension.

Further embodiments of the invention are possible, in which the liner has two resilient membranes or over three membranes. Preferably, the liner has either two or three membranes. Most preferably, it has three membranes.

Figure 2A:
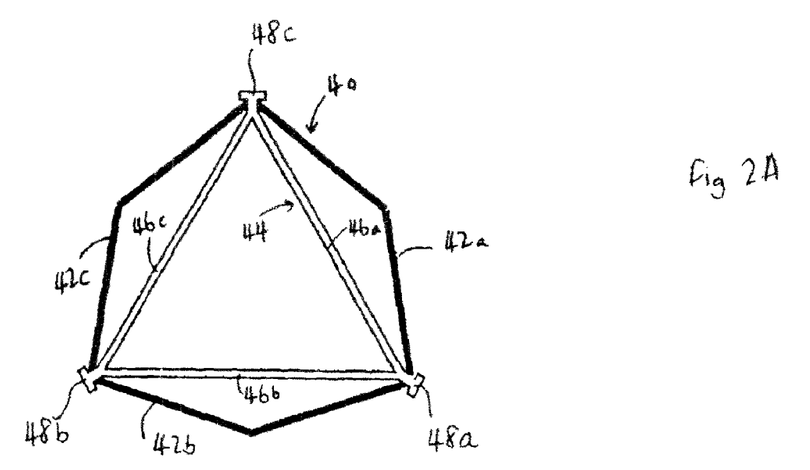
FIGS. 2A and 2B show the liner and support structure according to second and third embodiments of the invention.

The tensioning elements 14a, 14b, 14c of the support structure 12 shown in FIG. 1A are curved. However, other geometries are possible. For example, a second embodiment of the invention, shown in FIG. 2A, has a support structure 40 with tensioning elements 42a, 42b, 42c that are peaked in shape and hold the membranes 46a, 46b, 46c of the liner 44 under tension. As in the case of the first embodiment, the membranes 46a, 46b, 46c are clipped onto the tensioning elements 42a, 42b, 42c of the support structure 40 by means of locks 48a, 48b, 48c provided at the longitudinal joins of membranes 46a, 46b, 46c.

Figure 2B:
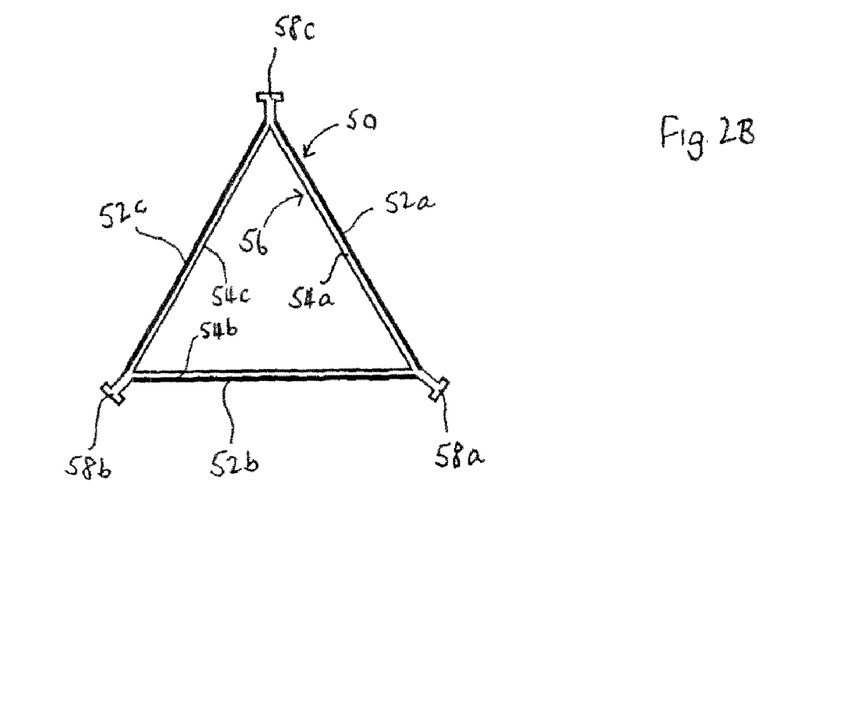

In a third embodiment of the invention, shown in FIG. 2B, the support structure 50 has tensioning elements 52a, 52b, 52c that are straight, and hold the membranes 54a, 54b, 54c of the liner 56 under tension. As in the case of the first and second embodiments, the membranes 54a, 54b, 54c of the liner 56 are clipped onto the tensioning elements 52a, 52b, 52c of the support structure 50 by means of locks 58a, 58b, 58c provided at the longitudinal joins of membranes 54a, 54b, 54c.

In general, it is easier to mount the resilient membranes of a liner onto tensioning elements that are themselves resilient. This is because these tensioning elements may be flexed in order to attach the membranes to the attachment points on each element. This process is further simplified by using tensioning elements that are already curved or peaked, particularly peaked, in their unloaded state. Furthermore, by using curved or peaked tensioning elements, particularly peaked elements, it is easier to tension the membranes at the low stresses required by this application, since these elements will tend to bend in order to relieve some of the tension in the membrane.

Figure 3:
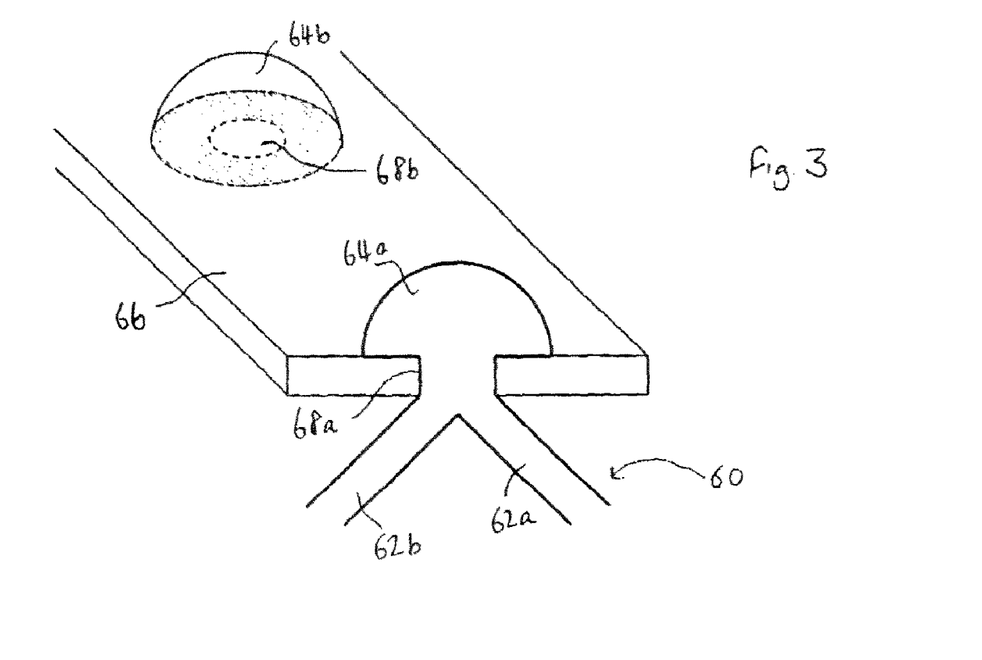
FIG. 3 shows the liner and support structure according to a fourth embodiment of the invention.

In the first, second, and third embodiments of the invention described above, the support structure is arranged so that the tensioning elements are held together by the locks provided on the liner, when the liner is mounted onto the support structure. However, a fourth embodiment of the invention is possible in which the tensioning elements are directly connected to form a shell. This embodiment is shown in FIG. 3, in which the liner 60 has a plurality of membranes, two of which, 62a and 62b are shown in this Figure. The membranes 62a, 62b are joined at their longitudinal edges. The liner 60 is mounted in an inner shell 66 by means of beads 64a, 64b provided along the longitudinally extending join of the membranes 62a, 62b. The inner shell 66 has openings 68a, 68b through which the beads 64a, 64b may be threaded in order to mount the liner in the shell.

Alternatively, the longitudinally extending joins of the membranes may be provided with ribs having enlarged outer ends. The membranes are mounted in the inner shell by sliding the ribs into slots provided in the inner shell.

What is claimed is:

1. Apparatus for removing milk from a teat of an animal, comprising:
    an outer body having an opening therein defining a first direction therein, said teat being insertable into said opening in said first direction;
    at least a first and a second resilient membrane, said first and second resilient membranes being held within said outer body, said first and second resilient membranes forming a space therebetween into which said teat is receivable when it is inserted into said opening;
    a support structure on which said first and second resilient membranes are mounted, said first and second resilient membranes are transversely stretched to place them under tension in a direction transverse to said first direction when there is the same pressure across said first and second resilient membranes, wherein said support structure is housed within said outer body and maintains said first and second resilient membranes under said tension independently of said outer body; and
    a pressure generating device for providing a pressure difference across said first and second resilient membranes.

2. Apparatus according to claim 1 wherein said support structure is a discrete component of the apparatus and is adapted to be removable from said outer body.

3. Apparatus according to claim 1 wherein said support structure has a first tensioning element having two spaced-apart attachment points and a second tensioning element having two spaced-apart attachment points, said first resilient membrane being attached to said first tensioning element of said support structure at said two spaced-apart attachment points so that said first resilient membrane is stretched to place it under tension in a direction transverse to said first direction when there is the same pressure across said first and second resilient membranes, and said second resilient membrane being attached to the second tensioning element of the support structure at said two spaced-apart attachment points, so that said second resilient membrane is stretched to place it under tension in a direction transverse to said first direction when there is the same pressure across said first and second resilient membranes.

4. Apparatus according to claim 3 wherein said first and second tensioning elements are elongate structures extending substantially along the length of said first and second resilient membranes, each of said first and second tensioning elements having a plurality of further pairs of spaced-apart attachment points located along the length of said first and second tensioning elements, said first and second resilient membranes being attached to said first and second tensioning elements respectively at said further pairs of spaced-apart attachment points.

5. Apparatus according to claim 4 wherein said pairs of spaced-apart attachment points form a first pair of spaced-apart attachment regions extending along the length of said first tensioning element and a second pair of spaced apart attachment regions extending along the length of said second tensioning element.

6. Apparatus according to claim 5 wherein said first and second pairs of spaced-apart attachment regions extend along the edges of said first and second tensioning elements.

7. Apparatus according to claim 3 wherein said spaced-apart attachment points on each of said first and second tensioning elements are joined by a bridge.

8. Apparatus according to claim 7 wherein said bridge is selected from the group consisting of a straight bridge, curved bridge and a bridge having a peak.

9. Apparatus according to claim 3 wherein said first and second tensioning elements of said support structure are joined to form a tube.

10. Apparatus according to claim 3 wherein said first and second tensioning elements are resilient.

11. Apparatus according to claim 10 wherein said resilient membranes are attached to the support structure at the joints between said resilient membranes.

12. Apparatus according to claim 1 comprising three or more resilient membranes joined together to form a tube having a polygonal cross-section in a plane substantially perpendicular to said first direction.

13. Apparatus according to claim 1 further comprising an engagement portion attached to said first and second resilient membranes or to said support structure, for engaging with said outer body to support said first and second resilient membranes and said support structure in said outer body.

14. Apparatus according to claim 13 wherein said engagement portion is a flange attached to said first and second resilient membranes, which fits over the top of said outer body.

15. Apparatus for removing milk from a teat of an animal, comprising:
    an outer body having an opening therein defining a first direction therein into which opening the teat is insertable in said first direction;
    at least a first and a second resilient membrane, said first and second resilient membranes being held within the body and forming a space therebetween into which said teat is receivable when it is inserted into said opening;
    a support structure held within said outer body, said support structure having a first tensioning element having two spaced-apart attachment points and a second tensioning element having two spaced-apart attachment points, said first resilient membrane being attached to said first tensioning element of said support structure at said two spaced-apart attachment points, so that said first resilient membrane is stretched to place it under tension in a direction transverse to said first direction when there is the same pressure across said first and second resilient membranes, said second resilient membrane being attached to said second tensioning element of said support structure at said two spaced-apart attachment points, so that said second resilient membrane is stretched to place it under tension in a direction transverse to said first direction when there is the same pressure across said first and second resilient membranes; and a pressure generating device for applying a pressure difference across said first and second resilient membranes.

16. A component of an apparatus for removing milk from the teat of an animal, the component having an elongate shape defining a first direction along its direction of elongation, the component comprising at least a first and a second resilient membrane, and a support structure on which said first and second resilient membranes are mounted, the support structure having a first tensioning element having two spaced-apart attachment points and a second tensioning element having two spaced-apart attachment points, wherein said first resilient membrane is attached to said first tensioning element of said support structure at said two spaced-apart attachment points, so that said first resilient membrane is stretched to place it under tension in a direction transverse to said first direction when there is the same pressure across said first and second resilient membranes, and said second resilient membrane is attached to said second tensioning element of said support structure at said two spaced-apart attachment points, so that said second resilient membrane is stretched to place it under tension in a direction transverse to said first direction when there is the same pressure across said first and second resilient membranes.

17. A component according to claim 16 wherein said first and second tensioning elements are elongate structures extending substantially along the length of said first and second resilient membranes, each of said first and second tensioning elements having a plurality of further pairs of spaced-apart attachment points located along the length of said first and second tensioning elements, the first and second resilient membranes being attached to said first and second tensioning elements respectively at said further pairs of spaced-apart attachment points.

18. A component according to claim 17 wherein said pairs of spaced-apart attachment points merge to form a first pair of spaced-apart attachment regions extending along the length of said first tensioning element and a second pair of spaced-apart attachment regions extending along the length of said second tensioning element.

19. A component according to claim 18 wherein said first and seconds pairs of spaced-apart attachment regions extend along the edges of said first and second tensioning elements.

20. A component according to claim 16 wherein said spaced-apart attachment points on each of said first and second tensioning elements are joined by a bridge.

21. A component according to claim 20 wherein said bridge is selected from the group consisting of a straight bridge, curved bridge and a bridge having a peak.

22. A component according to claim 16 wherein said first and second tensioning elements of said support structure are joined to form a tube.

23. A component according to claim 16 wherein said first and second tensioning elements are resilient.

24. A component according to claim 16 comprising three or more resilient membranes joined together to form a tube having a polygonal cross-section in a plane substantially perpendicular to said first direction.

25. A component according to claim 24 wherein said resilient membranes are attached to the support structure at the joins between said resilient membranes.

26. A component according to claim 16 further comprising an engagement portion attached to said first and second resilient membranes or to said support structure, for engaging with an outer body of said apparatus for removing milk from the teat of an animal, to support said component in said outer body.

27. Apparatus according to claim 26 wherein said engagement portion is a flange attached to said first and second resilient membranes, which fits over the top of said outer body.

28. A kit of parts for constructing an apparatus for removing milk from the teat of an animal, the kit comprising an outer body having an opening therein defining a first direction, said teat being insertable into said first opening in said first direction;

at least a first and a second resilient membrane holdable within said outer body;

at least a first tensioning element having two spaced-apart attachment points and a second tensioning element having two spaced apart attachment points for constructing a support structure, said support structure being housable within said outer body; and a pressure generating device for providing a pressure difference across said first and second resilient membranes, wherein said first resilient membrane is attachable to said first tensioning element at said two spaced-apart attachment points so that said first resilient membrane is stretched to place it under tension in a direction transverse to said first direction when there is the same pressure across said first and second resilient membranes and wherein said second resilient membrane is attachable to said second tensioning element so that said second resilient membrane is stretched to place it under tension in a direction transverse to said first direction when there is the same pressure across said first and second resilient membranes, wherein said first and second tensioning elements of said support structure are capable of maintaining said first and second resilient membranes under said tension independently of said outer body.

29. A kit of parts for constructing a component of an apparatus for removing milk from the teat of an animal, the kit comprising at least a first and a second resilient membrane; and at least a first tensioning element having two spaced-apart attachment points and a second tensioning element having two spaced-apart attachment points, wherein said first and second resilient membranes and said first and second tensioning elements are attachable together to form a component having an elongate shape and defining a first direction along its elongation direction, and wherein said first resilient membrane is attachable to said first tensioning element at said two spaced-apart attachment points so that said first resilient membrane is stretched to place it under tension in a direction transverse to said first direction when there is the same pressure across said first and second resilient membranes and wherein said second resilient membrane is attachable to said second tensioning element so that said second resilient membrane is stretched to place it under tension in a direction transverse to said first direction when there is the same pressure across said first and second resilient membranes.

30. A method of removing milk from the teat of an animal, comprising:
- inserting the teat into a space formed between at least a first and a second resilient membrane housed in an outer body, said space defining a teat insertion direction; and
- generating a pressure difference across said first and second resilient membranes to cause said first and second resilient membranes to fall onto the teat,
- wherein said first and second resilient membranes are mounted on a support structure, and stretched to place them under tension in a direction transverse to said teat insertion direction by said support structure before said pressure difference is generated across said first and second membranes, wherein said support structure is housed within said outer body and maintains said first and second resilient membranes under said tension independently of said outer body.

31. A method according to claim 30 wherein said support structure has a first tensioning element having two spaced-apart attachment points and a second tensioning element having two spaced-apart attachment points, said first resilient membrane being attached to said first tensioning element of said support structure at said two spaced-apart attachment points so that said first resilient membrane is stretched to place it under tension in a direction transverse to said teat insertion direction before said pressure difference is generated across said first and second resilient membranes, and said second resilient membrane being attached to said second tensioning element of said support structure at said two spaced apart attachment points, so that said second resilient membrane is stretched to place it under tension in a direction transverse to said teat insertion direction before said pressure difference is generated across said first and second resilient membranes.

* * * * *